Feb. 15, 1972　　　T. G. CLAYTON　　　3,642,968
MANUFACTURE OF BRICKS
Filed April 30, 1969　　　　　　　　　　2 Sheets-Sheet 1
FIG.Ia.
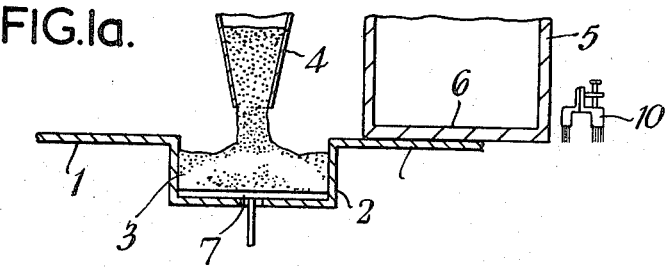
FIG.Ib.
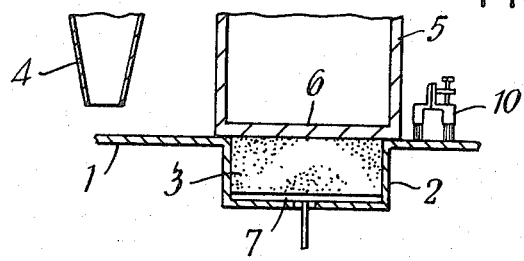
FIG.Ic.
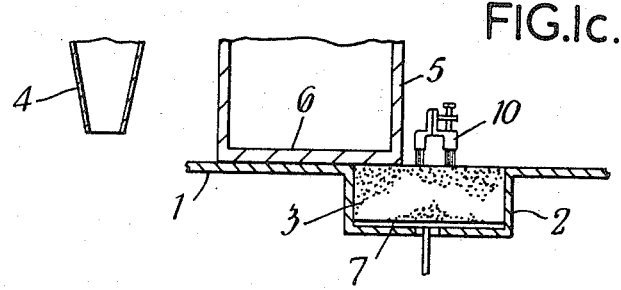
FIG.Id.
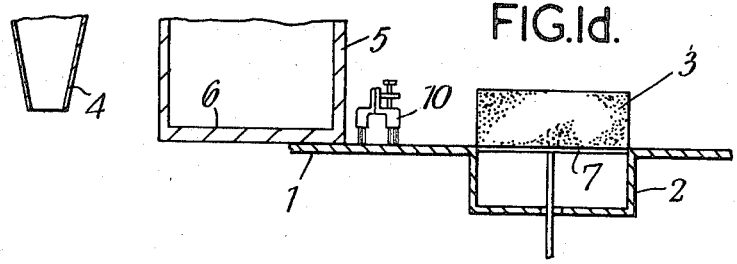

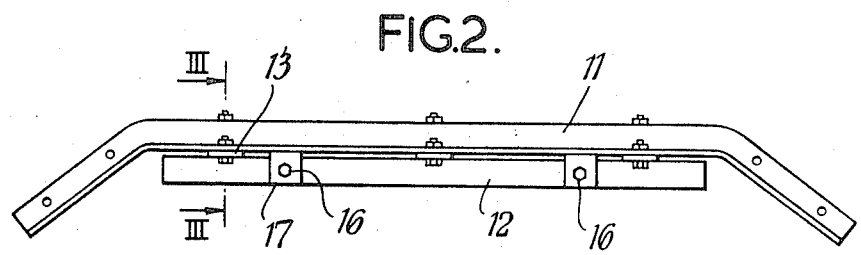
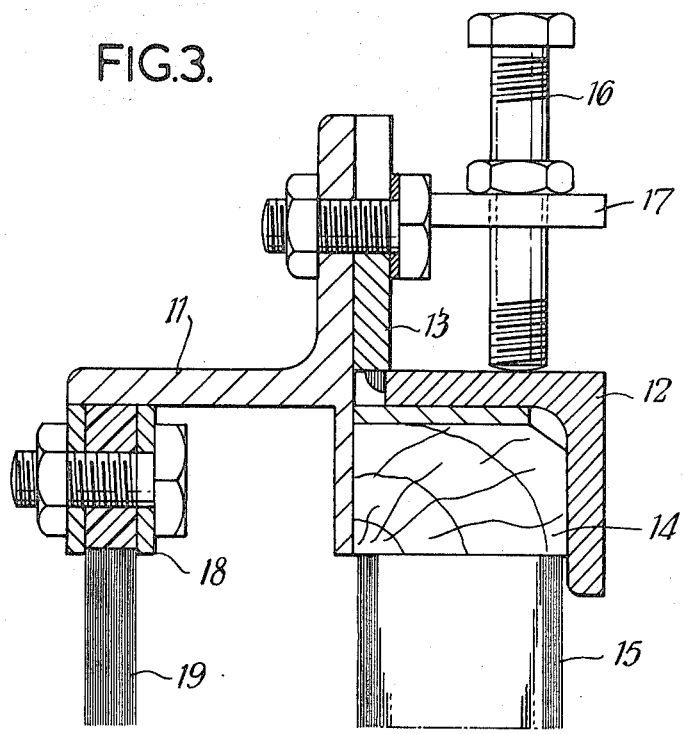

United States Patent Office 3,642,968
Patented Feb. 15, 1972

3,642,968
MANUFACTURE OF BRICKS
Thomas George Clayton, Plymouth, England, assignor to English Clays Lovering Pochin & Company Limited, St. Austell, Cornwall, England
Filed Apr. 30, 1969, Ser. No. 820,510
Int. Cl. B28b 11/00; C04b 15/12
U.S. Cl. 264—82                                      10 Claims

ABSTRACT OF THE DISCLOSURE

A method of manufacturing a building element having a textured surface on at least one face thereof. The building element is formed from a composition comprising a granular aggregate, a bonding material and water in specified proportions, the composition being compacted in a mould at a pressure of at least 1 long ton per square inch to form a coherent body which is thereafter hardened by treatment with steam. The textured surface is formed on the building element by passing the compacted composition whilst it is contained in the mould and before it is hardened beneath a wire brush which is positioned so as to contact one face of the compacted composition and from thereon a textured surface.

BACKGROUND OF THE INVENTION

This invention relates to a method of preparing a building element, for example a brick, having a textured finish on at least one face thereof.

It is known to produce building elements, for example bricks, having a textured surface on at least one face thereof by compacting a composition consisting essentially of sand and lime in a mould, removing the compacted composition from the mould, brushing the surface of the compacted composition, after it has been removed from the mould, in which it was shaped and compacted, to produce a textured surface on at least one face thereof, and hardening the compacted composition. A serious disadvantage of this method, as practiced heretofore, is that the arrises of the building element tend to break away during the brushing process, and it is an object of the present invention to provide a method of manufacturing a building element which obviates this disadvantage.

SUMMARY OF THE INVENTION

It has now been found, in accordance with the present invention, that by proper control of the composition from which the building element is formed and by adopting a new technique for brushing the surface of the building element the disadvantages noted above can be avoided. More particularly, in accordance with the present invention there is provided a method of manufacturing a building element having a textured surface on at least one face thereof which method comprises the steps of:

(a) Forming a composition comprising a granular aggregate, a bonding material and water, wherein the aggregate constitutes from 60% to 90% by weight of the solids in the composition and is composed wholly or substantially wholly of siliceous material passing a ⅜ inch mesh British Standard sieve and retained on a No. 100 mesh British Standard sieve, wherein the bonding material constitutes from 40% to 10% by weight of the solids in the composition and is composed wholly or substantially wholly of material passing a No. 100 mesh British Standard sieve and capable of forming on reaction with water stable, substantially insoluble, hydrated calcium silicates, and wherein the quantity of water in the composition is in the range of from 3% to 10% by weight based on the total weight of solids in the composition.

(b) Compacting said composition in a mould at a pressure of at least 1 long ton per square inch to form a coherent body, (c) Passing the compacted composition whilst it is contained in the mould beneath a wire brush which is positioned so as to contact one face of the compacted composition and from thereon a textured surface, (d) Ejecting the compacted composition as a coherent body from the mould; and (e) Hardening the coherent body by treatment with steam.

DESCRIPTION OF THE PREFERRED EMBODIMENTS

The granular aggregate used in forming the composition consists wholly or substantially wholly of siliceous material passing a ⅜ inch mesh British Standard sieve and retained on a No. 100 mesh British Standard sieve (150 microns nominal aperture) and can be, for example, a naturally fine or artifically ground sand or siliceous rock or quarry material. Advantageously, the granular aggregate will comprise at least 20% by weight of material passing a No. 25 mesh B.S. sieve (600 microns nominal aperture).

The bonding material is preferably a mixture of finely divided siliceous material, e.g. silica flour and/or slate power (which generally contains from about 40% to about 50% by weight of free silica), and lime which can be in the form of hydrated lime, quick lime or spent calcium carbide or a mixture of two or more thereof. Part of the aforesaid mixture can be replaced by a portland cement. The bonding material advantageously has a composition such that the molar ratio $CaO:SiO_2$ is in the range of from 1:1.5 to 1:2.5 and most advantageously is about 1:2.0. When the bonding material contains materials other than those capable of forming hydrated calcium silicates, and optionally a small amount of calcium aluminates, such other materials should be substantially inert. Moreover, as the amount of the inert material present in the bonding material is increased so the amount of bonding material in the mixture of aggregate and bonding material is increased. When part of the mixture of finely divided siliceous material and lime-containing material is replaced by portland cement, the amount of portland cement generally does not exceed 15% of the total weight of solids in the composition.

The aggregate should constitute at least 60% by weight of the solids in the composition in order to ensure that there is sufficient aggregate to give the desired open texture after brushing. On the other hand, the bonding material should constitute at least 10% by weight of the solids in the composition in order to ensure that the bond between the particles of the composition is sufficiently strong to retain the coarse particles of aggregate in the compacted composition.

The water content of the composition is in the range of from 3% to 10% by weight, preferably in the range of from 4% to 8% by weight and most preferably in the range of 5% to 7% by weight, based on the total weight of solids in the composition. If the water content is less than 3% the compacted element has such poor strength after compaction that it disintegrates on brushing. On the other hand, if the water content is greater than 10% a large proportion of the voids in the composition are filled with water so that it becomes impossible to achieve the necessary degree of compaction.

The pressure used to compact the composition should be greater than one long ton per square inch, in order to ensure that the compacted composition does not disintegrate on brushing, and preferably is greater than 1½ long tons per square inch. There is no restriction on whether the composition is compacted by applying pressure from the top, from the bottom, or from top and bottom simultaneously. If any pressure is applied from the top the effect is to depress the upper surface of the compacted composition below the upper lip of the mould and in this case in order to obtain the desired textured surface the mould is constructed so that as it travels from the compacting position to the ejecting position the bottom of the mould is raised thus bringing the top surface of the compacted composition into contact with the wire brush.

The optimum depth of penetration of the bristles of the wire brush into the compacted composition depends on the particle size of the aggregate used in the composition. The depth of penetration is preferably in the range of from ¼ to ½ of the diameter of the largest particles which appear in the aggregate. For example, when the aggregate includes particles which are ⅜ inch mesh British Standard sieve in size the depth of penetration of the bristles should be in the range of from 3/32 of an inch to 3/16 of an inch.

The wire brush used to produce the textured surface is preferably formed of bristles made from a steel and have an effective length in the range of from 0.5 to 1.5 inches and a diameter in the range of from 0.004 to 0.030 inch.

The wire brush is advantageously secured to the press used to compact the composition. A preferred arrangement of the wire bristles is to dispose the bristles in clumps consisting of about 10–40 wires having a diameter within the specified range, the clumps be placed about 3/16 to ½ inch apart in staggered rows so that the whole width of the building element is covered, i.e. every point on the surface of the element which is to be textured is contacted by at least one clump of bristles. In one embodiment of the invention the wire brush is not secured rigidly to the press used to compact the composition but is mounted so that lateral oscillations, i.e. perpendicular to the direction of motion of the mould box, can be imparted to it. By careful choice of the number and spacing of the wire bristles on the brush there may be inscribed on the compacted composition patterns comprising a series of wavy lines where the aggregate has been exposed by brushing away softer material. In one such embodiment the wire bristles are disposed in clumps each consisting of about 10–40 wires in the specified diameter range, and the clumps are placed ¼ to ½ inch apart in not more than 2 rows running transverse to the direction of motion of the building element. If a second row of clumps of bristles is provided each clump in the second row is behind a corresponding clump in the first row i.e. if the brush is viewed directly in the line of motion of the building element only one transverse row of clumps of bristles is seen. The frequency of the oscillation of the brush is preferably in the range 1 to 10 cycles per second and the amplitude in the range ⅜ to ½ inch.

After compacting and texturing, the composition now in the form of a coherent body is steam hardened by treatment with steam. The steam hardening can be performed either in a steam curing chamber with steam at atmospheric pressure or up to about 50 p.s.i.g., or in an autoclave in which case the steam is at a pressure of at least 50 p.s.i.g. and is preferably greater than 180 p.s.i.g.

For a better understanding of the invention and to show how the same may be carried into effect reference will now be made, by way of example, to the accompanying drawings.

FIGS. 1A to 1D show diagrammatically four stages in the manufacture of textured sand/lime bricks in accordance with the invention;

FIG. 2 shows a plan view of part of the apparatus shown diagrammatically in FIGS. 1A to 1D; and FIG. 3 is a section, on an enlarged scale, along the line III—III of FIG. 2.

Referring first to FIGS. 1A to 1D there is shown a table 1 which incorporates a mould box 2 which is adapted to reciprocate between the two extreme positions. In one extreme position, as shown in FIG. 1A, the mould box 2 is disposed beneath a hopper 4 from which a sand/lime brick composition 3 is fed into the mould box 2. After the mould box 2 has been filled it moves to an intermediate position, as shown in FIG. 1B, whereat the mould box is disposed beneath a press 5 including a fixed upper platen 6 which is adapted to co-operate with a moveable lower platen 7 to apply a pressure of from 2 to 3 tons per square inch to the sand/lime brick composition. After the sand/lime brick composition has been compacted the table 1 moves to the position shown in FIG. 1D whereat the brick is ejected from the mould box and then transferred to the next stage in the manufacturing process. During the movement of the table 1 from the position shown in FIG. 1B to that shown in FIG. 1D the mould box, and therefore the upper surface of the brick composition, passes beneath and in contact with a brushing device 10 as shown in FIG. 1C. Whilst the brick composition is passing beneath the brushing device 10 some of the sand is removed from the surface layer of the compacted composition thereby forming a textured surface on the exposed face of brick composition.

After the textured brick has been ejected from the mould box 2 and transferred to the next stage in the manufacturing process, wherein it is hardened by treatment with steam, the table 1 returns to the position shown in FIG. 1A. During this movement the sand removed from the surface of the compacted brick composition is brushed by the brushing device 10 into the mould box 2 thereby avoiding unnecessary waste.

The brushing device 10 is shown in more detail in FIGS. 2 and 3. A girder 11, which can be secured at its ends, supports a second girder 12 by means of brackets 13. To the girder 12 there is attached a texturing brush 14 having steel wire bristles 15 each of which is 1.25 inches long and has a diameter of 0.015 inch. The brackets 13 are displaceable relative to the girder 11 and, by means of a screw 16 mounted in an extension 17, enable the depth of penetration of the bristles into the compacted sand/lime brick composition to be varied. A second brush 18 having nylon bristles each of which is 1.5 inches long and has a diameter of 0.016 inch is secured to the girder 11 and sweeps the sand particles, which are removed from the compacted sand/lime brick composition, into the empty mould box 2 during the return of the table 1 to its initial position as shown in FIG. 1A.

It will be appreciated that, although it is advantageous to employ a second brush, such as brush 18, to sweep the sand particles into the empty mould box, this second brush is not essential. If the second brush 18 is not used, the sand particles may be blown away or sucked up into a suitable receptacle from which they can be transferred to the hopper 4.

The invention is further illustrated by the following examples.

EXAMPLE 1

Five compositions were made up from the materials and in the proportions shown in the following table.

TABLE

| Composition No. | 1 | 2 | 3 | 4 | 5 |
|---|---|---|---|---|---|
| Coarse aggregate (wt. percent) | 50 | 60 | 80 | 90 | 92 |
| Silica flour (wt. percent) | 33 | 27 | 13 | 7 | 5 |
| Slaked lime (wt. percent) | 17 | 13 | 7 | 3 | 3 |
| Molar ratio $CaO:SiO_2$ | 1:2.12 | 1:2.16 | 1:1.92 | 1:2.38 | 1:1.72 |

The coarse aggregate was washed china clay waste sand having a particle size such that 100% by weight passed a ⅜ inch British Standard sieve (10 mm.) and 21% by weight passed a No. 25 mesh British Standard sieve (No.

30 mesh A.S.T.M. Standard). The silica flour had been finely ground so that 100% by weight passed a No. 100 mesh British Standard sieve (No. 100 mesh A.S.T.M. Standard), 90% by weight passed a No. 300 mesh British Standard sieve (No. 270 mesh A.S.T.M. Standard), 25% by weight consisted of particles smaller than 10 microns and 4% by weight consisted of particles smaller than 2 microns. Each dry composition was then mixed with 6% by weight of water, based on the total dry weight of the composition, and was compacted in a brick press at a pressure of 3 long tons per square inch ($4.63 \times 10^7$ Nm.$^{-2}$).

The coherent compacted bodies thus formed were, whilst still being contained in the mould, passed beneath a wire brush which was constructed as shown in FIGS. 2 and 3 and positioned so as to contact one face of the compacted composition and form thereon a textured surface. The depth of penetration of the bristles of the wire brush into the compacted composition was adjusted to be in the range ¼ to ½ the diameter of the largest particles in the aggregate. The coherent bodies were then ejected from the mould and hardened by treatment with steam in an autoclave for 4½ hours at a maximum pressure of 225 p.s.i.g. ($1.55 \times 10^6$ Nm.$^{-2}$). For this treatment, the pressure in the autoclave was raised from atmospheric pressure to 50 p.s.i.g. ($3.44 \times 10^5$ Nm.$^{-2}$) in 30 minutes, and from 50 p.s.i.g. to 225 p.s.i.g. in a further 60 minutes, and this elevated pressure was then maintained throughout the remainder of the processing time.

The textured surface of the bricks made from the five compositions were then examined, and it was found that the bricks from Composition No. 1 did not have a satisfactory textured surface as there was insufficient coarse aggregate to give the desired roughened effect over the whole face of a brick and the particles of coarse aggregate were very unevenly distributed. The bricks from Compositions No. 2, 3 and 4 had satisfactory textured faces, although in the bricks from Composition No. 4 several particles of coarse aggregate were removed from the surface by the brush leaving unsightly pits. The bricks from Composition No. 5 were unacceptable because the textured face was very crumbly and the majority of the larger particles of aggregate had been removed from the surface by the brush leaving a deeply pitted face.

EXAMPLE 2

Three batches of dry Composition No. 3, described in Example 1 above, were mixed with 2.5%, 6% and 10.5% by weight of water, respectively, based on the total weight of solids, and an attempt was made to form textured bricks from each composition by the process described in Example 1. It was found that the composition containing 2.5% by weight of water formed a brick whose surface crumbled under the action of the brush, that the composition containing 6% by weight of water gave a satisfactory textured brick, and that it was impossible to form a compacted body from the composition containing 10.5% by weight of water.

EXAMPLE 3

Three batches of dry Composition No. 3, described in Example 1, were each mixed with 6% by weight of water based on the total weight of solids and were pressed at pressures of ½, 1 and 3 long tons per square inch, respectively, ($7.61 \times 10^6$, $1.54 \times 10^7$ and $4.63 \times 10^7$ Nm.$^{-2}$). The compacted bodies were then brushed and hardened as described in Example 1. It was found that of the compacted bodies pressed at ½ long ton per square inch nearly all crumbled on brushing or disintegrated on removal from the mould. Of those pressed at 1 long ton per square inch about 10% were wasted because of crumbling during brushing or breaking on removal from the mould. Of those pressed at 3 long tons per square inch only 1% were wasted.

I claim:

1. A method of manufacturing a building element having a textured surface on at least one face thereof which method comprises the steps of:
   (a) forming a composition comprising a granular aggregate, a bonding material and water, wherein the aggregate constitutes from 60% to 90% by weight of the solids in the composition and is composed substantially wholly of different sizes of siliceous material passing a ⅜ inch mesh British Standard sieve and retained on a No. 100 mesh British Standard sieve, wherein the bonding material constitutes from 40% to 10% by weight of the solids in the composition and is composed substantially wholly of material passing a No. 100 mesh British Standard sieve and capable of forming on reaction with water stable, substantially insoluble, hydrated calcium silicates, and wherein the quantity of water in the composition is in the range of from 3% to 10% by weight based on the total weight of solids in the composition,
   (b) compacting said composition in a mould at a pressure of at least 1 long ton per square inch to form a coherent body, none of the coherent body projecting beyond the limits of the mould,
   (c) passing the compacted composition whilst it is contained in the mould beneath bristles of a wire brush so as to cause penetration of the bristles into one face of the compacted composition to a depth corresponding to from ¼ to ½ of the diameter of the largest particles in the aggregate, the bristles having a diameter of from 0.004 to 0.030 inch, so as to cause removal of fine particles from the compacted composition without causing removal of the larger particles, whereby a textured surface is formed,
   (d) ejecting the compacted composition as a coherent body from the mould, and
   (e) hardening the coherent body by treatment with steam.

2. A method according to claim 1, wherein the granular aggregate comprises at least 20% by weight of material passing a No. 25 mesh British Standard sieve.

3. A method according to claim 1, wherein the bonding material has a composition such that the molar ratio $CaO:SiO_2$ is in the range 1:1.5 to 1:2.5.

4. A method according to claim 1, wherein the water content of the composition is in the range of from 4% to 8% by weight, based on the total weight of solids in the composition.

5. A method according to claim 1, wherein the pressure applied to the composition to compact the same is greater than 1½ long tons per square inch.

6. A method according to claim 1, wherein the bristles of the brush are made from a steel and have an effective length in the range of from 0.5 to 1.5 inches.

7. A method according to claim 1, wherein the bristles of the brush are arranged in clumps consisting of from 10 to 40 bristles, the clumps being arranged in staggered rows and spaced apart by from 3/16 inch to ½ inch.

8. A method according to claim 1, wherein said wire brush is adapted to reciprocate in a direction substantially perpendicular to the direction in which the compacted composition is passed beneath the wire brush.

9. A method according to claim 1, wherein the coherent body is hardened by treatment with steam in an autoclave.

10. A method according to claim 9, wherein the bonding material has a composition such that the molar ratio $CaO:SiO_2$ is in the range 1:1.5 to 1:2.5, wherein the water content of the composition is in the range of from 5% to 7% by weight, based on the total weight of solids in the composition, and wherein the coherent body is hardened by treatment with steam at a pressure greater than 180 p.s.i.g.

References Cited

UNITED STATES PATENTS

| | | | |
|---|---|---|---|
| 3,366,720 | 1/1968 | Burger | 264—122 |
| 1,735,497 | 11/1929 | Dury | 264—162 |
| 3,378,617 | 4/1968 | Elmerdorf | 264—162 |
| 3,505,439 | 4/1970 | Moorehead | 264—82 |
| 1,293,076 | 2/1919 | Fritzinger | 25—1 |
| 3,202,737 | 8/1965 | Tsuda | 264—82 |

ROBERT F. WHITE, Primary Examiner

R. SHEAR, Assistant Examiner

U.S. Cl. X.R.

25—1 C; 264—162